US008431906B2

(12) United States Patent
Andrews et al.

(10) Patent No.: US 8,431,906 B2
(45) Date of Patent: Apr. 30, 2013

(54) FAST NEUTRON DETECTOR HAVING AN OPEN-STRUCTURED HYDROGENOUS RADIATOR

(75) Inventors: Hugh Robert Andrews, Pembroke (CA); Marius Emanuel Facina, Deep River (CA); Harry Ing, Deep River (CA); Vernon Theodore Koslowsky, Deep River Ontario (CA); Vitali Dmitrievitch Kovaltchouk, Chalk River (CA); Irina Stefanescu, Deep River (CA)

(73) Assignee: Bubble Technology Industry Inc., Chalk River, Ontario (CA)

( * ) Notice: Subject to any disclaimer, the term of this patent is extended or adjusted under 35 U.S.C. 154(b) by 219 days.

(21) Appl. No.: 12/859,643

(22) Filed: Aug. 19, 2010

(65) Prior Publication Data
US 2011/0042577 A1 Feb. 24, 2011

(30) Foreign Application Priority Data
Aug. 21, 2009 (CA) .................................... 2676311

(51) Int. Cl.
*G01T 3/00* (2006.01)
(52) U.S. Cl.
USPC .................................................... 250/390.12
(58) Field of Classification Search .............. 250/390.01–390.12, 269.1–269.8
See application file for complete search history.

(56) References Cited

U.S. PATENT DOCUMENTS

| 3,805,078 | A | | 4/1974 | Kozlov |
| 4,570,067 | A | * | 2/1986 | Gadeken ........................ 250/266 |
| 6,639,210 | B2 | | 10/2003 | Odom et al. |

OTHER PUBLICATIONS

Key et al., "On the radiation tolerance of SU-, a new material for gasesous microstructure radiation detector fabrication," 2004, Radiation Physics and Chemistry, vol. 71, pp. 1003-1007.*
Dangendorf et al., "Detectors for time-of-flight fast neutron radiography 1. Neutron-counting gas detector," 2005, Nuclear Instruments and Methods in Physics Research A, vol. 542, pp. 197-205.*
William J. Price, "Nuclear Radiation Detection," 2nd Ed. (McGraw-Hill, New York (1964)), p. 350.
C.H. Johnson, "Fast Neutron Physics, Part I," edited by J.B. Marion and J.L. Fowler (Interscience Publishers, Inc., New York (1960)), Chapter II.C, pp. 247-295.
Glenn F. Knoll, "Radiation Detection and Measurement," 3rd Ed. (John Wiley & Sons, Inc., U.S. (2000)), pp. 569-570.
J. A. B. Gibson, "Radiation Protection Dosimetry," (Nuclear Technology Publishing, vol. 10, No. 1-4 (1985)), pp. 197-205.

(Continued)

*Primary Examiner* — Kiho Kim
(74) *Attorney, Agent, or Firm* — McDonald Hopkins LLC

(57) ABSTRACT

A detector for fast neutrons has been developed which includes 1) selected open structure of solid hydrogen-containing material which converts impinging neutrons into recoil protons; 2) a surrounding gas which interacts with the protons to release electrons; 3) an electric field able to drift the electrons through and away from the open-structure material; and 4) an electron detector which monitors the drifted electrons thereby sensing the original impinging neutrons. This type of detector is advantageous for many applications, including efficient fast neutron detection; large area imaging of fast neutrons for fast neutron radiography; or fast neutron beam profiling.

8 Claims, 7 Drawing Sheets

OTHER PUBLICATIONS

T. Bolognese-Milsztajn; M. Ginjaume; M. Luszik-Bhadra; F. Vanhavere; W. Wahl; and A. Weeks, "Radiation Protection Dosimetry," (European Radiation Dosimetry Group, vol. 112, No. 1 (2004)), pp. 141-168.

S. Agosteo; C. Birattari; G. D'Angelo; F. Dal Corso; A. Foglio Para; I. Lippi; A. Pola; and P. Zotta, "Neutron spectrometry with a recoil radiator-silicon detector device," (Nuclear Instruments and Methods in Physics Research A 515 (2003)), pp. 589-604.

M.J. Key; V. Cindro; and M. Lozano, "On the radiation tolerance of SU-8, a new material for gaseous microstructure radiation detector fabrication," (Radiation Physics and Chemistry 71 (2004)), pp. 1003-1007.

* cited by examiner

FAST NEUTRON DETECTOR HAVING AN OPEN-STRUCTURED HYDROGENOUS RADIATOR

CROSS REFERENCE TO RELATED APPLICATIONS

This application claims priority to Canadian Patent Application Serial No. 2,676,311 filed Aug. 21, 2009.

FIELD OF INVENTION

This invention relates to the detection of high-energy (>0.1 MeV) or "fast" neutrons. In particular, it pertains to a new high-efficiency radiator that serves the function of intercepting incident fast neutrons and converting them to a comparable number of charged particles, particularly protons, which can then be detected by a variety of common radiation detectors that can sense charged particles.

BACKGROUND OF THE INVENTION

Detection of Fast Neutrons

The efficient detection of fast neutrons, especially over a large area (e.g. >10 cm×10 cm) is currently technologically limited. The common methods for efficient detection of fast neutrons are via interactions with the hydrogen nucleus (i.e. a proton) in a solid or liquid medium. The hydrogen nucleus is important because it has a high interaction probability (i.e. large neutron cross-section) for fast neutrons. Furthermore, because of its low mass, the interaction of the neutron with the hydrogen nucleus produces a recoiling charged proton with high average energy because of reaction kinematics. Thus, the neutron loses much more of its energy in a collision with the hydrogen nucleus than in a collision with a heavier nucleus; this energy loss is transferred to the proton, making it relatively easy to detect using modern conventional radiation detectors.

Several solid hydrogenous scintillators are commonly used for efficient fast neutron detection. Examples include ordinary plastic scintillators, stilbene crystals, doped p-terphenol crystals and anthracene crystals. The reason that these are all organic type materials is that all scintillation detectors also respond to ubiquitous gamma rays in our everyday environment. Since gamma rays interact strongly with materials of high atomic number (Z), neutron detectors that are based on organic (low Z) material have the least response to gamma rays, which could otherwise mask the neutron signal. Fortunately, all of the above scintillators, except the plastic scintillator, also have the useful property that neutron and gamma-ray interactions lead to luminescence signals with different decay times. By using fast timing electronics, it is possible to separate the neutron and gamma-ray signals, i.e. discriminate gamma ray signals in favour of neutron signals. However, plastic scintillators do not possess this timing characteristic, making them of limited use for most neutron detection applications.

The most widely-used fast neutron detector with good detection efficiency is a liquid hydrogenous scintillator, known under the commercial trade-names of NE-213 or BC-501. These are chemical mixtures of xylene, naphthalene and wavelength-shifters. These detectors have good detection efficiency and good timing properties to allow for neutron/gamma discrimination.

All the above detectors are scintillators, which imply that they need a method to convert the scintillations (short flashes of light) into an electronic signal that can be processed and analyzed. The most common method of achieving this conversion is to use a photomultiplier tube (PMT). The PMT is a sealed tubular glass assembly under high vacuum. On the front end of the assembly is a photocathode—a very thin layer of a compound (often an alkali compound) that has a low work function and high secondary electron emission. Following the photocathode is a structure (dynodes) whose purpose is to amplify the electrons from the photocathode into a large enough electronic pulse for analogue and digital analysis. Thus, neutron interactions in the scintillator produce light, which is directed towards the PMT. This light penetrates the glass layer on the front of the PMT to impinge the photocathode substrate which leads to secondary electron emission. Under an applied high voltage, these secondary electrons are amplified by the dynode structure to produce an electronic signal at the anode, located on the back end of the PMT.

Aside from the use of scintillators, there is another approach where neutron scattering with hydrogen is used as the basis of a fast neutron detector. This utilizes a thin layer (radiator foil) of hydrogenous material (e.g. polyethylene) directly in front of a charged particle detector (e.g. a silicon diode). When neutrons interact with hydrogen in the radiator foil, many of the protons, scattered in the forward direction, escape from the foil to impinge the charged particle detector and are thus counted. The detection efficiency of this approach is limited by the maximum thickness of foil that permits the scattered protons to escape (for 2.5 MeV neutrons, thickness is $\leq 100$ μm) and the area of the proton detector. Silicon diode detectors are often the proton detector of choice. These detectors are commonly only 1 to 5 cm2 because larger-area detectors suffer from excessive electronic noise due to the larger capacitance. These constraints limit the achievable radiator detection efficiency to less than ~1%. The use of proton radiators has mainly been used for small detection systems.

There are also several fast neutron detectors that are based on various types of gases (e.g. hydrogen-filled counters, 3He counters, BF3 counters, 4He recoil spectrometers, gaseous scintillation detectors, etc.). However, because these detectors are in the gaseous phase, the molecular density of these types of detectors is much lower than solid or liquid phase detectors, resulting in low detection efficiency. This attribute of gaseous counters makes them irrelevant for the current discussion.

There is another class of neutron detectors that detect lower-energy (i.e. "thermal" neutrons), rather than fast neutrons. While this fact alone may appear to eliminate them from further consideration, there are various designs of fast neutron detectors that actually utilize thermal neutron detectors. This apparent contradiction is clarified by explaining that such designs make use of hydrogenous moderators (e.g. polyethylene) to convert fast neutrons to thermal neutron (via hydrogen scattering) so that the thermal neutron detectors can be used as the sensor. However, the use of a neutron moderator to convert fast neutrons to thermal neutrons is generally an inefficient process. Except for special counting geometries, this approach cannot yield detection efficiencies beyond a few percent. Furthermore, the thermalization process takes up to a millisecond to convert a fast neutron to a thermal neutron; so such detectors cannot be used for reasonably prompt counting of fast neutrons. Also, the thermal neutrons migrate significant distances in the moderator material, making such detectors not appropriate for good imaging applications.

More complete discussions of neutron detection technologies, photomultipliers and silicon diode detectors are given in standard reference books on radiation detection (e.g. G. F.

Knoll, Radiation Detection and Measurements third edition (John Wiley & Sons, United States (2000)).

Limitations of Existing Fast Neutron Detection Technologies for Large Area Detection and Attempts at Improvements There are many applications where it is desirable to have a large-area, efficient fast neutron detector. One main application is in connection with fast neutron radiography, of interest to homeland security or medical physics applications. Fast neutrons are particularly suited for imaging low Z materials, such as explosives, narcotics, or human tissue.

It is currently possible to meet this requirement by constructing a large matrix array of fast neutron scintillators viewed with individual photomultipliers (PMTs). However, a typical single detector element might measure 5 cm×5 cm×5 cm thick. A modest area of, say, 30 cm×30 cm would then require 36 detectors. A larger area of 1 m×1 m would require 400 detectors. Such an approach can be extremely expensive (each PMT alone costs several hundred dollars) and physically complex. A slightly different configuration could involve a large flat reservoir of liquid scintillator viewed by a matrix of independent PMTs through a glass wall on the backside of the reservoir. However, the cost and complexity of such a system would not be significantly reduced. It would also be possible to use a large slab of plastic scintillator (plastic scintillators are not expensive) viewed with a matrix of photodiodes (photodiodes are much more economical than PMTS). Such an assembly is less costly, but this system would not be able to discriminate against ubiquitous gamma rays by pulse-shape discrimination.

BRIEF SUMMARY OF THE INVENTION

The present invention provides a new radiator for fast neutron detection. We term this invention the Microstructure Neutron Radiator (MNR).

The MNR comprises a hydrogenous material surrounded by a gas and subject to an electric field. The hydrogenous material converts impinging neutrons into recoil protons and is finely structured to provide a high surface area to volume ratio, thereby promoting the escape of the recoil protons from the hydrogenous material. The material is immersed in a gas (preferably, but not necessarily, a stable gas or gas mixture with a low electron affinity and the ability to provide electron multiplication, e.g. methane, argon, etc.). As the recoil protons traverse the gas, they produce ionization in the form of electron ion pairs. An electric field is applied to drift the electrons through and away from the hydrogenous material. The electrons can then be detected by any appropriate electron detector (such as a proportional counter or gas electron multiplier), thereby providing a method of indirectly detecting the original impinging fast neutrons.

The fine structuring of the hydrogenous material can take a number of forms including: 1) an array of fine plastic bristles (as in a brush); 2) a parallel array of fine plastic sheets with normals perpendicular to the incident fast neutrons; 3) a stack of thin plastic plates, each perforated with holes of appropriate diameters and pitch to optimize escape of the recoil protons into the gas-filled voids; 4) layers of plastic mesh with appropriate openings and grid dimensions; and 5) any other geometry of hydrogenous material which promotes the escape of the recoil protons from the material and permits the electrons to drift away from the material and towards an electron detector under an applied electric field. In each case, electrically-conductive surfaces allow the application of appropriate voltages to drift the electrons through the array to the electron detector.

The MNR is capable of high detection efficiency by optimizing the distance from the interior of a radiating element to the surrounding gas-filled voids in order to maximize the detection of the recoil protons and through the size and/or number of the radiating elements: in cases 1) and 2) by the length of the dimension parallel to the incident neutron directions; in cases 3) and 4) by stacking plastic layers perpendicular to the incident direction. Configuration 3) is particularly suitable for the creation of large, cost-effective detectors due to its ability to be produced by applying common circuit card manufacturing techniques to hydrogenous plates of material.

The MNR is also capable of providing position-sensitive neutron detection when the electrons exiting the gas-filled voids are detected by an electron detector with position-sensitive read-out.

DETAILED DESCRIPTION

Figure 1:
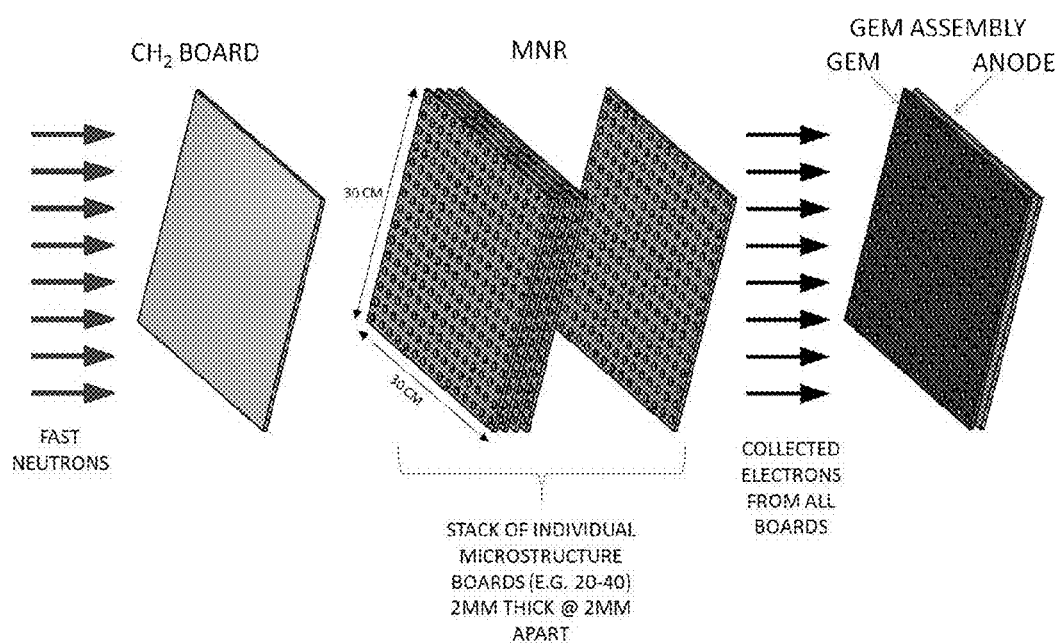
FIG. 1 is an exploded view of one type of multi-layer fast neutron detector, according to the invention.

FIG. 1 shows a conceptual drawing of one embodiment of the MNR. It consists of a stack of microstructured boards (made of a hydrocarbon polymer, CH2, such as high-density polyethylene), either separated by a small gap or on contact with each other, and placed within a gas. A small voltage is applied across each board to collect the electrons produced by the recoil protons which interact with the gas in the holes and the space (if it exists) between the boards. The figure shows a CH2 board in front of the MNR as an added source of recoiling protons to increase neutron detection efficiency. A Gas Electron Multiplier (GEM) assembly is shown following the MNR and serves as a method to amplify and detect the electrons. Other means of amplification can be used. The size, thickness and number of microstructure boards can be varied to attain a particular detection performance of the MNR to meet a particular neutron detection requirement.

Figure 2:
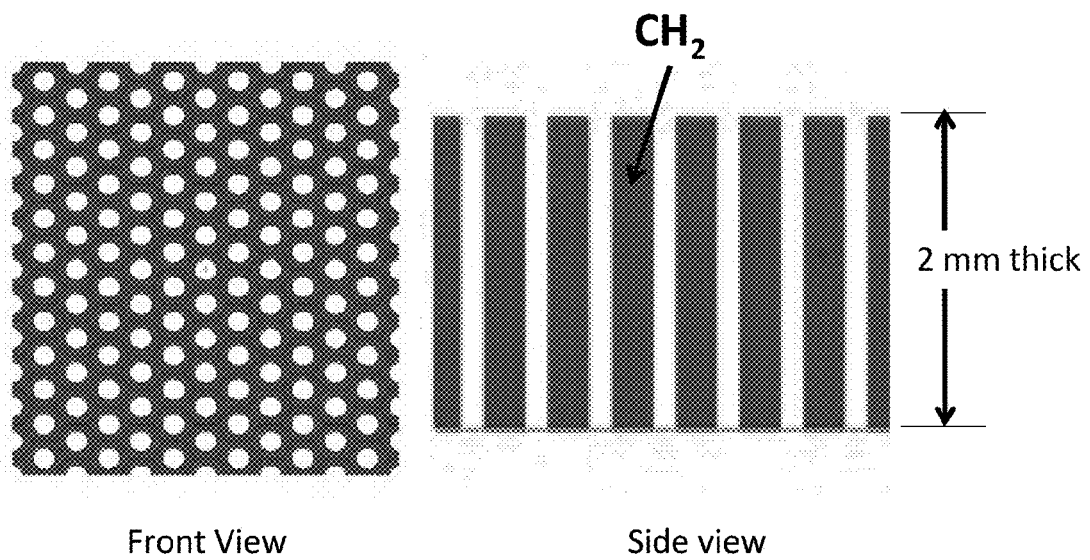
FIG. 2 shows front and side views of one perforated board of hydrogenous material.

To illustrate the properties of the MNR, we selected a MNR having a surface area 30 cm×30 cm and consisting of 35 microstructure circuit boards, each 2 mm thick. The boards were spaced apart with ceramic spacers 2 mm thick, making the MNR 14 cm thick. Simulations of the performance of the MNR immersed in a 1 atmosphere mixture of 10% methane and 90% argon ("P-10") gas were carried out using the well-established MCNPX code and the latest ENDF-B/VII neutron cross-section library. A parallel beam of neutrons (of different energies) impinge the front face of the MNR to interact with the microstructure board. All neutron interactions and recoil protons in the MNR were tracked. Energy depositions in the gas contained in both the holes and the space (2 mm) between the boards were separately determined along with the total counts per unit fluence of incident neutrons. Different hole patterns in the microstructure boards were studied. FIG. 2 (left side) shows one pattern consisting of 0.15 mm diameter holes at 0.250 mm spacing (pitch). The right side shows a side view of a board to give an indication of hole to material ratio.

Figure 3:
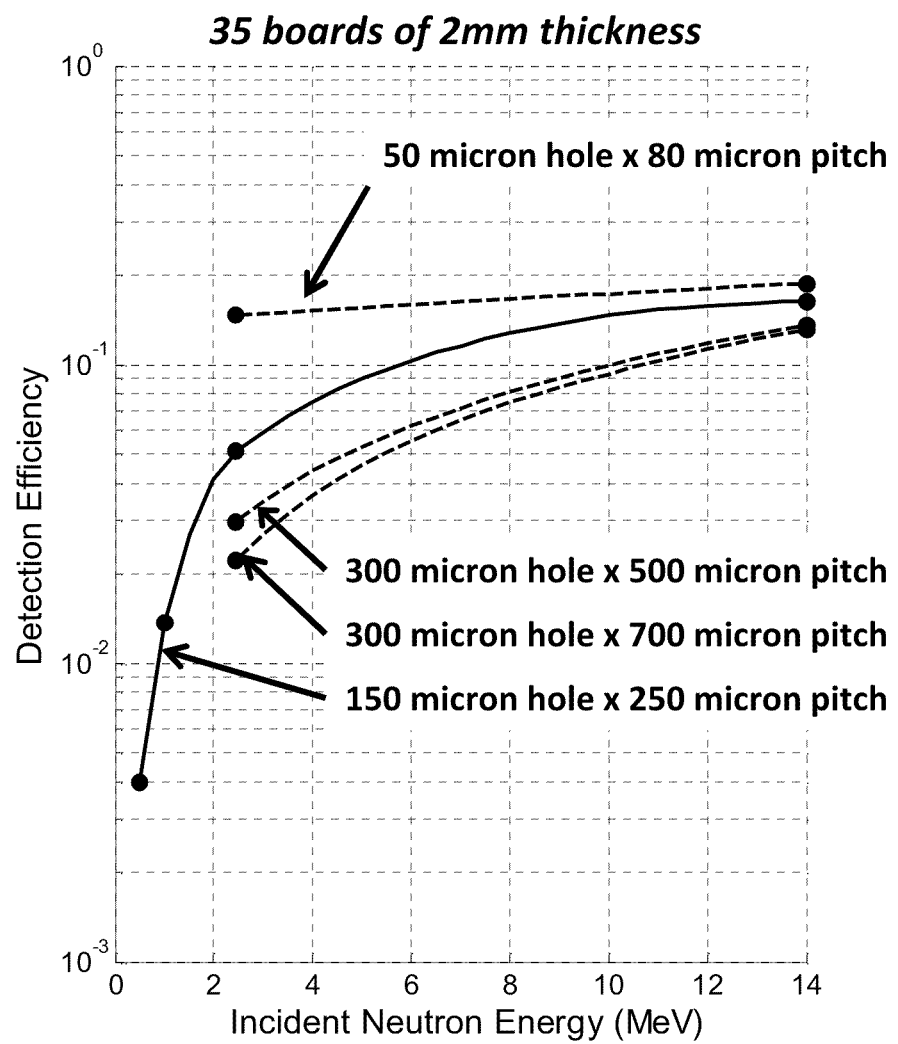
FIG. 3 is a graph showing detection efficiency for 4 perforation designs.

The detection efficiency of this particular design of the MNR for various neutron energies is given in FIG. 3 (solid line).

The detection efficiency is 16% for 14 MeV and drops significantly below about 0.5 MeV. At 14 MeV, 85% of the response is due to protons creating charge in holes and only 15% is due to escaping protons from the front board producing charge between the boards. A similar ratio was obtained for 2.5 MeV neutrons. When the hole pattern was changed to 50 µm holes at 80 µm pitch, the detection efficiency increases to 19% for 14 MeV neutrons and rises significantly to 15% for 2.5 MeV neutrons. The ratio of counts in the holes relative to the space between the boards increases to 95% for both energies. When the hole pattern is changed to 0.3 mm diameter holes at 0.7 mm pitch, the 14-MeV response decreases to 13% while the 2.5 MeV response drops to 2%. The contribution of counts from holes becomes 49% for 14 MeV and 53% for 2.5 MeV neutrons.

Thus it is clear that the shape of the response function of the MNR can be changed by selecting a particular hole pattern (and board thickness) to get a "tailored" response. Of course, the absolute detection efficiency can be increased or decreased by choosing the number of boards for the MNR and their thicknesses.

Figure 4:
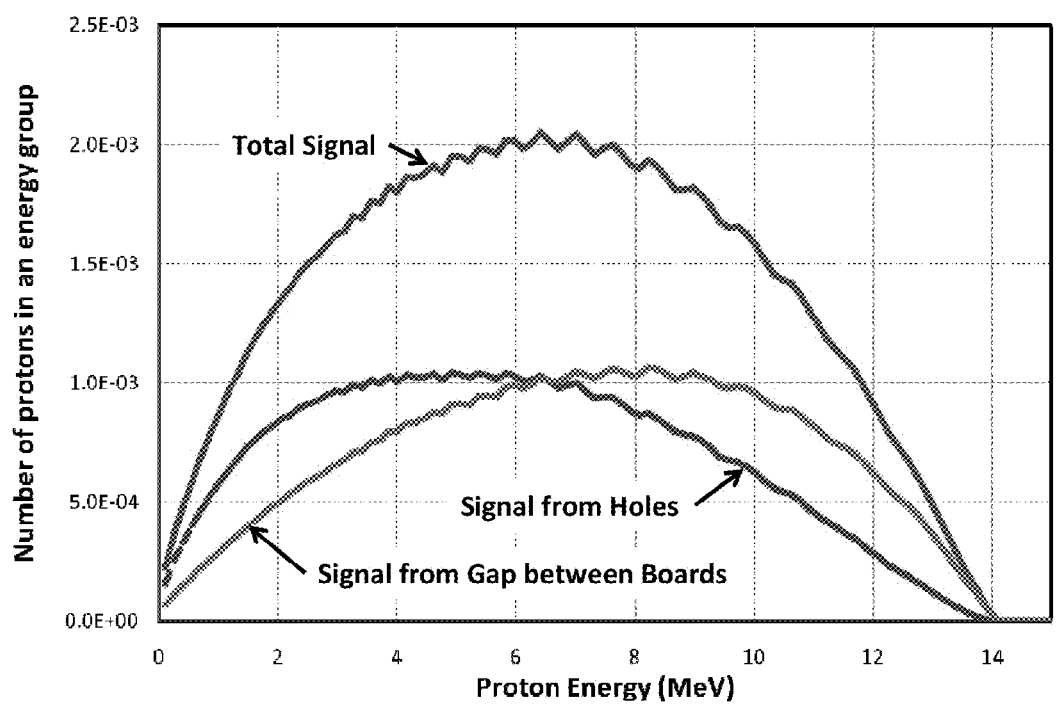
FIGS. 4 and 5 are graphs showing spectra of proton energies at two types of locations in the hydrogenous material for two neutron energies.

FIG. 4 shows the proton energy spectra for 14-MeV neutrons interacting with an MNR having a hole pattern of 0.3 mm diameter at 0.7 mm pitch.

The spectrum escaping from the back surface of the board has a broader energy distribution than the protons inside the holes. Both distributions extend to the maximum recoil proton energy of 14 MeV and also to very low energies.

Figure 5:
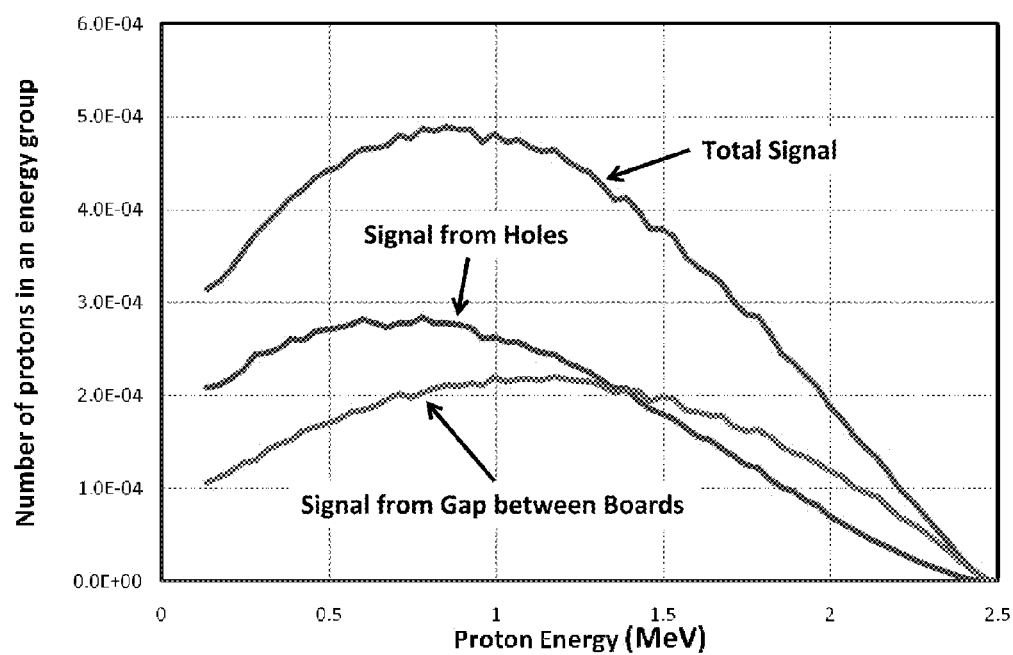

FIG. 5 shows the corresponding spectra for 2.5 MeV neutrons.

Broad energy distributions are seen extending from a maximum recoil proton energy of 2.5 MeV with a greater fraction of higher energy protons escaping from the backside of the board.

Figure 6:
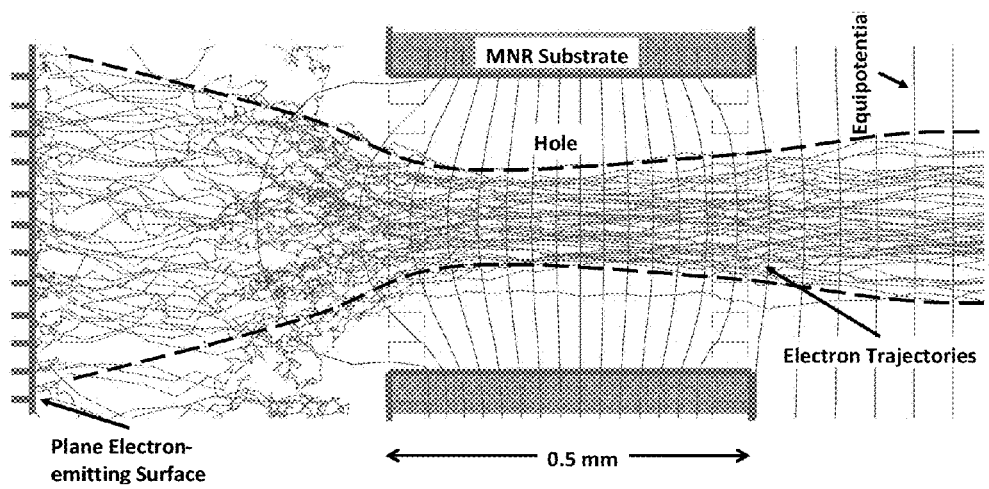
FIG. 6 shows a simulation of electron transmission through a perforated board of hydrogenous material of a particular perforation design.

Simulations of electron movement through a stack of MNR were done using the SIMION code, commonly used to describe electric fields for electro-optic designs. Here, electrons were assumed to be emitted from a surface in front of the MNR. The electrons were low energy, representative of those created by proton ionization in the P-10 gas and emitted in random directions over $2\pi$ steradians. The voltages across the boards and between boards were roughly adjusted to produce field lines that would drift the emitted electrons through the MNR board assembly containing P-10 gas. Although the voltages were not optimized, quite good transmission efficiency was attained. The results gave 52% electron transmission after passing through 20 boards. This transmission efficiency is quite adequate to detect the ionization produced by proton ionization in the MNR. The actual voltage is dependent on the size and pattern of the holes—the smaller the hole, the lower the voltage. By fine tuning of the voltages, higher transmission fractions can be attained. FIG. 6 illustrates the simulated electron trajectories in the vicinity of a MNR hole.

Figure 7:
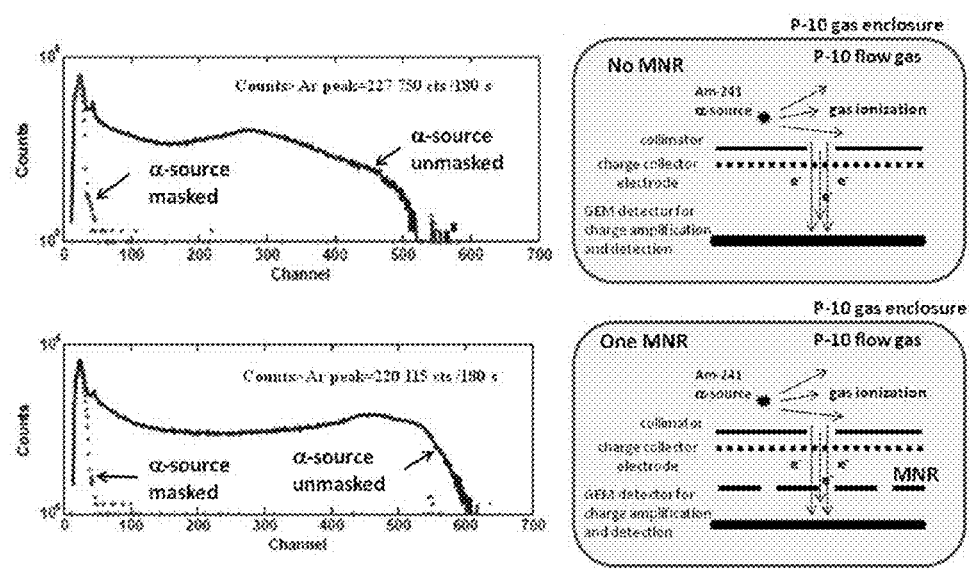
FIG. 7 shows two graphs (and accompanying diagrams) summarizing results of electron transmission in the absence of and through a perforated board of hydrogenous material.

FIG. 7 describes a measurement to demonstrate efficient electron transmission through a microstructured radiator. The measurement consists of two phases, a reference phase with no MNR board and a phase with a MNR board.

The top right panel shows, schematically, the measurement (reference) setup without a MNR. An Am-241 alpha source is utilized to create ionization in a 1 atmosphere P-10 gas. Electrons from the ionization are drawn towards the charge collection electrode, pass through the openings in the electrode and eventually reach the GEM detector at the bottom of the enclosure where they are detected and counted. The collimator prevents alpha-particles from striking the detector and creating secondary electrons which would partially mask the desired signal. The measured signal amplitude spectrum is shown in the upper left corner of the figure.

The figure on the bottom right is identical with the reference setup, described above, with one change; a MNR is placed in the region between the charge collector electrode and the GEM detector and biased appropriately. The bottom left figure shows the signal amplitude spectrum when the electrons are transmitted through a MNR. The net counts from the alpha sources are seen to be essentially identical. This confirms that the microstructure boards can be operated at relatively low voltages to drift electrons and get high electron transmission. The signal spectra are slightly different in shape due to minor differences in the detector gain.

The above experiments were done using a GEM as the electron amplifier. Of course, this amplification could have been done by merely having an anode wire (as used in many gas proportional counters) at a similar high voltage, if imaging is not necessary for the application. For crude imaging, a matrix of wires could be used, as in a conventional position-sensitive proportional counter, to get the required electron amplification.

The invention claimed is:

1. A detector for fast neutrons comprising:
    a hydrogenous material of open structure able to convert impinging neutrons into recoil protons, the open structure being selected to allow escape of said protons;
    a surrounding gas selected to provide electron release from resulting proton-gas interaction;
    an applied electric field able to drift the released electrons through and away from the hydrogenous material; and
    an electron detector selected to receive and monitor the drifted electrons, and to thereby sense the original impinging neutrons.

2. The detector of claim 1 wherein the hydrogenous material is comprised of multiple layers of selected open porosity and spacing able to promote escape of the recoil protons, and proton-gas interaction.

3. The detector of claim 1 wherein the hydrogenous material is a selected hydrocarbon polymer.

4. The detector of claim 1 wherein the electron detector includes an electron multiplier assembly.

5. The detector of claim 4 wherein the electron multiplier assembly is a gas electron multiplier, a single-wire proportional counter, or a multi-wire proportional counter.

6. The detector of claim 1 wherein the electron detector includes means for position-sensitive read-out.

7. The detector of claim 1 wherein the hydrogenous material includes an imperforated sheet in front of the open structure.

8. The detector of claim 1 wherein the degree of porosity and channeling in the hydrogenous material open structure is selected to give the desired detection efficiency.

\* \* \* \* \*

UNITED STATES PATENT AND TRADEMARK OFFICE
CERTIFICATE OF CORRECTION

PATENT NO.        : 8,431,906 B2  
APPLICATION NO.   : 12/859643  
DATED             : April 30, 2013  
INVENTOR(S)       : Hugh Robert Andrews et al.

Page 1 of 1

It is certified that error appears in the above-identified patent and that said Letters Patent is hereby corrected as shown below:

On the Title Page Item (73) Assignee: Delete "Industry" and insert --Industries--

Signed and Sealed this
Eighteenth Day of March, 2014

Michelle K. Lee
*Deputy Director of the United States Patent and Trademark Office*